(12) United States Patent
Kaneko et al.

(10) Patent No.: US 9,453,136 B2
(45) Date of Patent: Sep. 27, 2016

(54) ACTIVE ENERGY RAY-CURABLE OFFSET PRINTING INK COMPOSITION

(71) Applicant: SAKATA INX CORPORATION, Osaka-shi, Osaka (JP)

(72) Inventors: Toru Kaneko, Osaka (JP); Keishiro Hishinuma, Osaka (JP); Naoki Omi, Osaka (JP); Amane Yamamoto, Osaka (JP); Kouhei Shimoyama, Osaka (JP)

(73) Assignee: SAKATA INX CORPORATION, Osaka-shi (JP)

( * ) Notice: Subject to any disclaimer, the term of this patent is extended or adjusted under 35 U.S.C. 154(b) by 0 days.

(21) Appl. No.: 14/774,653

(22) PCT Filed: Feb. 13, 2014

(86) PCT No.: PCT/JP2014/053260
§ 371 (c)(1),
(2) Date: Sep. 10, 2015

(87) PCT Pub. No.: WO2014/141801
PCT Pub. Date: Sep. 18, 2014

(65) Prior Publication Data
US 2016/0017159 A1    Jan. 21, 2016

(30) Foreign Application Priority Data

Mar. 12, 2013 (JP) .................. 2013-049742

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 11/107* | (2014.01) | |
| *C09D 11/037* | (2014.01) | |
| *C09D 11/101* | (2014.01) | |
| *C08K 3/34* | (2006.01) | |
| *C08K 5/27* | (2006.01) | |

(52) U.S. Cl.
CPC ............... *C09D 11/107* (2013.01); *C08K 3/34* (2013.01); *C08K 5/27* (2013.01); *C09D 11/037* (2013.01); *C09D 11/101* (2013.01)

(58) Field of Classification Search
CPC . C09D 11/037; C09D 11/107; C09D 11/101; C08K 5/27; C08K 3/34
USPC ........ 522/39, 33, 6, 71, 1, 189, 184, 53, 49; 520/1
See application file for complete search history.

(56) References Cited

U.S. PATENT DOCUMENTS

2011/0143128 A1*  6/2011  Saitou ................. B29C 45/1418
                                                         428/336

FOREIGN PATENT DOCUMENTS

| CN | 102341248 A | 2/2012 |
|---|---|---|
| GB | 2193469 A | 2/1988 |
| JP | 03252472 A | 11/1991 |
| JP | 10130559 A | 5/1998 |
| JP | 2009114256 A | 5/2009 |
| JP | 4649952 B2 | 3/2011 |
| JP | 2012102217 A | 5/2012 |

OTHER PUBLICATIONS

ISA Japanese Patent Office, International Search Report Issued in Application No. PCT/JP2014/053260, Mar. 18, 2014, WIPO, 2 pages.
European Patent Office, Extended European Search Report Issued in Application No. 14762542.0, Jul. 12, 2016, Germany, 5 pages.

* cited by examiner

*Primary Examiner* — Ling Choi
*Assistant Examiner* — Jessica E Whiteley
(74) *Attorney, Agent, or Firm* — Alleman Hall McCoy Russell & Tuttle LLP

(57) ABSTRACT

Provided is an active energy ray-curable offset printing ink composition that can prevent occurrence of a slurring phenomenon. The active energy ray-curable offset printing ink composition includes a compound having an ethylenically unsaturated bond, a photopolymerization initiator, a colorant, and an extender pigment. The extender pigment has a median diameter (d50) of 1.0 to 2.0 μm measured by laser diffractometry. Printing with a reduced slurring phenomenon can be achieved using such an active energy ray-curable offset printing ink composition.

16 Claims, No Drawings

ACTIVE ENERGY RAY-CURABLE OFFSET PRINTING INK COMPOSITION

TECHNICAL FIELD

The present invention relates to an active energy ray-curable offset printing ink composition.

BACKGROUND ART

Offset printing is a printing system utilizing the water repelling property of an oil-based printing ink composition and using a printing plate not having asperities, unlike a relief printing system using a printing plate having asperities. This printing plate has lipophilic image areas and hydrophilic non-image areas, instead of asperities. First, the non-image areas are first wetted with a dampening solution supplied to the printing plate for printing. Second, an oil-based offset printing ink composition (hereinafter, also simply referred to as printing ink composition) is supplied to the printing plate. The non-image areas charged with water by the application of the dampening solution repel the printing ink composition and prevent the printing ink composition from adhering. In other words, the printing ink composition adheres to only the lipophilic image areas. An image of the printing ink composition is thereby formed on the printing plate, and then is transferred to a blanket and paper to complete printing.

Instead of the offset printing using a dampening solution as described above, a water-free offset printing system using a printing plate having non-image areas formed with a silicone resin has been put into practical use. In this printing system, the silicone resin, not a dampening solution, repels the printing ink composition to form non-image areas. Except in this respect, the water-free offset printing is identical to the offset printing using a dampening solution. In this specification, the term "offset printing" includes both printing systems using dampening solution and water-free printing systems.

Incidentally, if the printing ink composition adhering to the surface of a printed sheet prepared by offset printing is not sufficiently dried, the ink composition of the printed sheet will transfer to the back surface of another printed sheet laid on top of the printed sheet, or the ink will adhere to a finger in contact with the printed sheet. Accordingly, the printed sheet cannot be sent to any post-processing or be distributed as a product. A process for drying the printing ink composition adhering to the surface of a printed sheet is therefore required after the offset printing. The drying systems of the printing ink composition in the offset printing system are categorized into the following four types: oxidative polymerization, evaporation, infiltration, and photopolymerization, which are selected depending on the type of the printing ink composition used.

Among these systems, the system of drying a printing ink composition by infiltration dries the surface of a printed sheet by allowing the oil component contained in the printing ink composition adhering to the surface to infiltrate into the inside of the printed sheet and can achieve a dried state relatively quickly. In this drying system, however, the printing ink composition readily spreads on the surface of the printed sheet into enlarged dots. In addition, this drying system is unsuitable for printing on sheets showing slow infiltration of oil components, such as glossy paper, and is unsuitable for application to a field requiring high quality aesthetics, such as product packages and catalogs. The system of drying a printing ink composition by evaporation could cause environmental pollution by releasing a volatile organic compound (VOC) into the atmosphere, and is therefore rarely used.

From such a viewpoint, in order to prepare a printed sheet that is required to have high quality aesthetics, current trend is to use a system of drying a printing ink composition by oxidative polymerization. The printing ink composition used in this drying system contains unsaturated oil having a high iodine value, such as tung oil or linseed oil, and the unsaturated oil is oxidatively polymerized by oxygen in the air to form a non-sticky (i.e., dried) coating film. The system of drying a printing ink composition by oxidative polymerization does not have a process of infiltrating the oil component into the printed sheet or releasing the VOC to the atmosphere and therefore can provide printed matter having high aesthetics with a low environmental burden. Since the chemical reaction of oxidative polymerization of unsaturated oil takes a relatively long time, there is a risk of causing a quality problem due to incomplete drying of the printed sheet.

From the above-described background, printing employing the drying system through photopolymerization, i.e., drying through irradiation of a printed sheet with UV rays after printing has been extensively performed recently. The printing ink composition used in this drying system contains an ethylenically unsaturated monomer or oligomer and a photopolymerization initiator generating a radical by irradiation with active energy rays, such as UV rays, and forms a non-sticky (i.e., dried) coating film via quick polymerization of these components by irradiation with active energy rays after printing. Various offset printing ink compositions employing such a drying system have been proposed recently (for example, see Patent Literatures 1 and 2).

CITATION LIST

Patent Literature

PTL 1: Japanese Patent Laid-Open No. 2012-102217
PTL 2: Japanese Patent No. 4649952

SUMMARY OF INVENTION

Technical Problem

The printing ink compositions to be dried by photopolymerization drying systems have a short history compared to printing ink compositions to be dried by other drying systems, and the materials constituting the compositions are still at a developmental stage. Although polymers such as phenol resins have been used in traditional printing ink compositions for a long time for imparting viscoelastic properties to the traditional printing ink compositions, they cannot be used in photopolymerization drying ink compositions, due to poor compatibility with monomer or oligomer components contained in the ink compositions. As a result, resin components are unavoidably used that are different from those used in traditional printing ink compositions and have a relatively low molecular weight at this time. Consequently, the printing ink compositions used in the photopolymerization drying system often cause various problems related to poor viscoelastic characteristics during printing operations.

One of these problems is an occurrence of a whisker blur extending from the non-image area at the boundary between an image area and a non-image area toward the direction of the tail edge of the printing plate. Such blur is also referred to as a slurring phenomenon and may occur due to factors such as vibration of the printer and an insufficient supply of the dampening solution. In the printing ink composition of the photopolymerization drying system, the blur may occur, for example, by oversupply of the dampening solution due to excessive viscosity of the ink or by poor separation of paper from the plate cylinder due to high tack (adhesiveness). The printing ink composition should be therefore improved.

An object of the present invention, which has been made in view of the above-described circumstances, is to provide an active energy ray-curable offset printing ink composition that barely causes slurring phenomena.

Solution to Problem

The present inventors have found that the above-mentioned problems can be solved with an extender pigment having a median diameter (d50) of 1.0 to 2.0 µm measured by laser diffractometry, which is a significantly larger particle diameter than that of the pigment in usual offset printing ink compositions, and have arrived at the present invention. Specifically, the present invention provides the following aspects.

The present invention relates to an active energy ray-curable offset printing ink composition comprising a compound having an ethylenically unsaturated bond, a photopolymerization initiator, a colorant, and an extender pigment having a median diameter (d50) of 1.0 to 2.0 µm measured by laser diffractometry.

The extender pigment is preferably talc and/or mica.

The amount of the extender pigment is preferably 0.5 to 5% by mass.

The photopolymerization initiator is preferably an α-(dialkyl)aminoalkylphenone compound, an α-morpholinoalkylphenone compound, a dialkylaminobenzophenone compound, a thioxanthone compound, or a combination of 2,4,6-trimethylbenzoyl diphenylphosphine oxide and dialkylaminobenzophenone compounds.

The active energy ray-curable offset printing ink composition preferably further contains a tertiary amine compound.

Advantageous Effects of Invention

The present invention provides an active energy ray-curable offset printing ink composition that can prevent occurrence of a slurring phenomenon.

DESCRIPTION OF EMBODIMENTS

An embodiment of the active energy ray-curable offset printing ink composition of the present invention will now be described.

The active energy ray-curable offset printing ink composition (hereinafter, appropriately abbreviated to printing ink composition) of the present invention is applicable to offset printing and curable by irradiation with active energy rays, such as UV rays or electron rays. More specifically, as described below, the printing ink composition of the present invention contains a compound (monomer) having an ethylenically unsaturated bond and a photopolymerization initiator and cures through polymerization of the monomer by radicals generated from the photopolymerization initiator irradiated with active energy rays. Accordingly, the sticky printing ink composition on the surface of a printed sheet quickly cures into a dried (tack free) film by irradiation with active energy rays immediately after printing. The printing ink composition of the present invention is applied to not only offset printing using a dampening solution but also water-free offset printing not using any dampening solution.

The active energy irradiation ray used for curing the printing ink composition of the present invention may be any type of rays that can generate radicals by cleaving chemical bonds in the photopolymerization initiator described below. Examples of the active energy rays include UV rays and electron rays. Among these active energy rays, UV rays are preferred for reasons of device cost and simplicity of treatment. The wavelength of UV rays may be appropriately determined depending on the absorption wavelength of the photopolymerization initiator described below and is, for example, 380 nm or less. Examples of the ultraviolet irradiation device generating UV rays include metal halide lamps, high-pressure mercury lamps, rare gas enclosed excimer lamps, and ultraviolet-ray emitting diodes (LEDs).

The printing ink composition of the present invention includes a compound having an ethylenically unsaturated bond, a photopolymerization initiator, a colorant, and an extender pigment. The composition preferably further includes a tertiary amine compound as a sensitizer. Each component will now be described.

[Compound Having an Ethylenically Unsaturated Bond]

The compound having an ethylenically unsaturated bond is a component to be polymerized into a polymer by radicals generated by the photopolymerization initiator described below and is a component referred to as a monomer or oligomer. A polymer having an ethylenically unsaturated bond is also a polymerizable candidate compound other than monomers or oligomers, and the only difference between a polymer and an oligomer is molecular weight. Such a polymer molecule is also polymerized with another molecule having an ethylenically unsaturated bond and is the same as an oligomer in this respect. In the present invention, the term "oligomer having an ethylenically unsaturated bond" describes a concept including these oligomers and polymers.

The monomer is a component having an ethylenically unsaturated bond and being polymerized into a polymer as described above. Since the monomer is a component having a relatively low molecular weight, the monomer is also used as a solvent for dissolving a resin component to prepare varnish or for adjusting the viscosity of a printing ink composition. Examples of the monomer include monofunctional monomers having a single ethylenically unsaturated bond in a molecule and di- or more functional monomers having two or more ethylenically unsaturated bonds in a molecule. A di- or more functional monomer can crosslink between molecules when the printing ink composition cures and thereby contributes to an increase in the curing rate and formation of a strong coating film. A monofunctional monomer does not have crosslinking ability, but contributes to a reduction in cure shrinkage accompanied by the crosslinking. These monomers may be used in combination as necessary.

Examples of the monofunctional monomer include alkyl acrylates, such as methyl (meth)acrylate, ethyl (meth)acrylate, butyl (meth)acrylate, hexyl (meth)acrylate, octyl (meth)acrylate, and dodecyl (meth)acrylate, (meth)acrylic acid, (meth)acrylates of ethylene oxide adducts, (meth)acrylates of propylene oxide adducts, isobornyl (meth)acrylate, cyclohexyl (meth)acrylate, tricyclodecane monomethylol (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, hydroxypentyl (meth)acrylate, 2-hydroxy-3-phenoxypropyl (meth)acrylate, 2-hydroxy-3-butoxypropyl (meth)acrylate, 2-hydroxy-3-methoxypropyl (meth)acrylate, diethylene glycol mono(meth)acrylate, triethylene glycol mono(meth) acrylate, polyethylene glycol mono(meth)acrylate, dipropylene glycol mono(meth)acrylate, polypropylene glycol mono (meth)acrylate, glycerin mono(meth)acrylate, acryloxyethyl phthalate, 2-(meth)acryloyloxyethyl-2-hydroxyethyl phthalate, 2-(meth)acryloyloxypropyl phthalate, β-carboxyethyl (meth)acrylate, (meth)acrylic acid dimers, ω-carboxypolycaprolactone mono(meth)acrylate, dimethyl aminoethyl (meth)acrylate, diethyl aminoethyl (meth)acrylate, N-vinylpyrrolidone, N-vinylformamide, and (meth)acryloyl morpholine. These monofunctional monomers can be used alone or in combination. Throughout the specification, the term "(meth)acrylate" refers to "acrylate and/or methacrylate," and the term "(meth)acrylic acid" refers to "acrylic acid and/or methacrylic acid."

Examples of di- or more functional monomer include difunctional monomers, such as ethylene glycol di(meth) acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, butylene glycol di(meth)acrylate, pentyl glycol di(meth)acrylate, neopentyl glycol di(meth)acrylate, hydroxypivalyl hydroxypivalate di(meth)acrylate, hydroxypivalyl hydroxypivalate dicaprolactonate di(meth)acrylate, 1,6-hexanediol di(meth)acrylate, 1,2-hexanediol di(meth)acrylate, 1,5-hexanediol di(meth) acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 1,10-decanediol di(meth) acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentanediol di(meth)acrylate, 3-methyl-1,5-pentanediol di(meth)acrylate, 2-methyl-2-propyl-1,3-propanediol di(meth) acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, dimethylol octane di(meth)acrylate, 2-ethyl-1,3-hexanediol di(meth)acrylate, 2,5-dimethyl-2,5-hexanediol di(meth)acrylate, 2-methyl-1, 8-octanediol di(meth)acrylate, 2-butyl 2-ethyl-1,3-propanediol di(meth)acrylate, 2,4-diethyl-1,5-pentanediol di(meth) acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth) acrylate, 1,2-decanediol di(meth)acrylate, 1,10-decanediol di(meth)acrylate, 1,2-decanediol di(meth)acrylate, 1,12-dodecanediol di(meth)acrylate, 1,2-dodecanediol di(meth) acrylate, 1,14-tetradecanediol di(meth)acrylate, 1,2-tetradecanediol di(meth)acrylate, 1,16-hexadecanediol di(meth) acrylate, 1,2-hexadecanediol di(meth)acrylate, 2-methyl-2, 4-pentane di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, dimethylol octane di(meth)acrylate, 2-ethyl-1,3-hexanediol di(meth)acrylate, 2,5-dimethyl-2,5-hexanediol di(meth)acrylate, 2-butyl-2-ethyl-1,3-propanediol di(meth)acrylate, 2,4-diethyl-1,5-pentanediol di(meth)acrylate, tricyclodecane dimethylol di(meth)acrylate, tricyclodecane dimethylol dicaprolactonate di(meth)acrylate, bisphenol A tetraethylene oxide adduct di(meth)acrylate, bisphenol F tetraethylene oxide adduct di(meth)acrylate, bisphenol S tetraethylene oxide adduct di(meth)acrylate, hydrogenerated bisphenol A tetraethylene oxide adduct di(meth)acrylate, hydrogenerated bisphenol F tetraethylene oxide adduct di(meth)acrylate, hydrogenerated bisphenol A di(meth)acrylate, hydrogenerated bisphenol F di(meth)acrylate, bisphenol A tetraethylene oxide adduct dicaprolactonate di(meth)acrylate, and bisphenol F tetraethylene oxide adduct dicaprolactonate di(meth)acrylate; trifunctional monomers, such as glycerin tri(meth)acrylate, trimethylolpropane tri(meth)acrylate, trimethylolpropane tricaprolactonate tri(meth)acrylate, trimethylolethane tri(meth)acrylate, trimethylolhexane tri(meth)acrylate, trimethyloloctane tri(meth)acrylate, and pentaerythritol tri(meth)acrylate; and tetra- or more functional monomers, such as trimethylolpropane tetra(meth)acrylate, pentaerythritol tetra(meth)acrylate, pentaerythritol tetracaprolactonate tetra(meth)acrylate, diglycerin tetra(meth)acrylate, ditrimethylolpropane tetra(meth)acrylate, ditrimethylol propane tetracaprolactonate tetra(meth)acrylate, ditrimethylolethane tetra(meth)acrylate, ditrimethylolbutane tetra(meth)acrylate, ditrimethylolhexane tetra(meth)acrylate, ditrimethyloloctane tetra(meth)acrylate, dipentaerythritol penta(meth)acrylate, dipentaerythritol hexa(meth)acrylate, tripentaerythritol hexa(meth)acrylate, tripentaerythritol hepta(meth)acrylate, tripentaerythritol octa(meth)acrylate, and tripentaerythritol polyalkylene oxide hepta(meth)acrylate. Among these monomers, preferred examples are trimethylolpropane triacrylate (TMPTA: trifunctional), ditrimethylolpropane tetraacrylate (DITMPTA: tetrafunctional), dipentaerythritol hexaacrylate (DPHA: hexafunctional), glycerin propoxy triacrylate (GPTA: trifunctional), and hexanediol diacrylate (HDDA: difunctional). These di- or greater functional monomers can be used alone or in combination.

The oligomer is a polymerizable component having a relatively high molecular weight and is also used for imparting appropriate viscoelastic properties to the printing ink composition. Examples of the oligomer include epoxymodified (meth)acrylates, such as an ester of (meth)acrylic acid and a hydroxy group generated by ring-opening of an epoxy group contained in an epoxy compound, such as an epoxy resin, with an acid or base; rosin-modified epoxy acrylates; polyester-modified (meth)acrylates, such as an ester of (meth)acrylic acid and the terminal hydroxy group of a condensation polymer of a dibasic acid and a diol; polyether-modified (meth)acrylates, such as an ester of and a terminal hydroxy group of a polyether compound and (meth)acrylic acid; and urethane-modified (meth)acrylic acids, such as an ester of (meth)acrylic acid and a terminal hydroxy group of a condensation product of a polyisocyanate compound and a polyol compound. These oligomers are commercially available, and examples thereof include Ebecryl series manufactured by Daicel-Allnex Ltd.; CN and SR series manufactured by Sartomer; Aronix M-6000 series, 7000 series, 8000 series, Aronix M-1100, Aronix M-1200, and Aronix M-1600 available from Toagosei Co., Ltd.; and NK Oligo available from Shin-Nakamura Chemical Co., Ltd. These oligomers can be used alone or in combination.

The amount of the compound having an ethylenically unsaturated bond in the printing ink composition is preferably 30% to 80% by mass, more preferably 40% to 75% by mass, and most preferably 50% to 70% by mass. The compatibility between satisfactory hardenability and printability can be achieved by adjusting the amount of the compound having an ethylenically unsaturated bond within the above-mentioned range. The mass ratio of the monomer to the oligomer (monomer:oligomer) is preferably 4:1 to 1:1, more preferably 3:1 to 1:1, and most preferably 2:1 to 1:1. The compatibility between satisfactory hardenability and printability can be achieved by adjusting the ratio of the monomer to the oligomer within the above-mentioned range.

[Photopolymerization Initiator]

The photopolymerization initiator is a component that generates radicals by irradiation with active energy rays. The generated radicals polymerize the compound having an ethylenically unsaturated bond to cure the printing ink composition. The photopolymerization initiator may be any initiator that absorbs active energy rays to generate radicals.

Examples of the photopolymerization initiator include benzophenone, 4,4'-bis(dimethylamino)benzophenone, 4,4'-bis(diethylamino)benzophenone, diethyl thioxanthone, 2-methyl-1-(4-methylthio)phenyl-2-morpholinopropan-1-one, 4-benzoyl-4'-methyldiphenyl sulfide, 2,4-diethyl thioxanthone, 2,4-dimethyl thioxanthone, 2,4-diisopropyl thioxanthone, 2-isopropyl thioxanthone, 4-diisopropyl thioxanthone, 2-isopropyl thioxanthone, 2,4-dichlorothioxanthone, 2-chlorothioxanthone, 2-hydroxy-3-(3,4-dimethyl-9-oxo-9H-thioxanthon-2-yloxy-N,N,N-trimethyl)-1-propaneamine hydrochloride, 1-chloro-4-propoxy thioxanthone, 4-isopropyl thioxanthone, 2-hydroxy-2-methyl-1-phenyl-propan-1-one, 1-hydroxycyclohexyl phenyl ketone, bis-2,6-dimethoxybenzoyl-2,4,4-trimethylpentylphosphine oxide, 1-[4-(2-hydroxyethoxy)-phenyl]-2-hydroxy-2-methyl-1-propan-1-one, 2,2-dimethyl-2-hydroxy acetophenone, 2,2-dimethoxy-2-phenyl acetophenone, 2,4,6-trimethylbenzoyl diphenylphosphine oxide (TPO), 2-benzyl-2-dimethyl-amino-1-(4-morpholinophenyl)-butan-1-one, and 2-dimethylamino-2-(4-methylbenzyl)-1-(4-morpholin-4-yl-phenyl)-butan-1-one. These photopolymerization initiators are commercially available, and examples thereof include Irgacure 907, Irgacure 369, Irgacure 184, Irgacure 379, Irgacure 819, and TPO available from BASF; and DETX available from Lamberti. These photopolymerization initiators may be used alone or in combination.

Among the above-mentioned photopolymerization initiators, preferred are a combination of four different compounds, an α-(dialkyl)aminoalkylphenone compound, an α-morpholinoaklylphenone compound, a dialkylaminobenzophenone compound, and a thioxanthone compound, and a combination of TPO and a dialkylaminobenzophenone compound. The use of such photopolymerization initiators can provide a printing ink composition exhibiting satisfactory curing characteristics when irradiated with UV rays.

Preferred examples of the α-(dialkyl)aminoalkylphenone compound include 2-benzyl-2-dimethylamino-1-(4-morpholinophenyl)-butan-1-one, 2-benzyl-2-diethylamino-1-(4-morpholinophenyl)-butan-1-one, 2-dimethylamino-2-(4-methylbenzyl)-1-(4-morpholin-4-yl-phenyl)-butan-1-one, and 2-diethylamino-2-(4-methylbenzyl)-1-(4-morpholin-4-yl-phenyl)-butan-1-one. Preferred examples of the α-morpholinoaklylphenone compound include 2-methyl-1-(4-methylthio)phenyl-2-morpholinopropan-1-one. These α-(dialkyl)aminoalkylphenone compounds and α-morpholinoaklylphenone compounds are categorized into photocleavage type photopolymerization initiators.

Preferred examples of the dialkylaminobenzophenone compound include 4,4'-dialkylaminobenzophenones, such as 4,4'-bis(dimethylamino)benzophenone and 4,4'-bis(diethylamino)benzophenone; and 4-benzoyl-4'-methyldiphenyl sulfide. Preferred examples of the thioxanthone compound include 2,4-diethyl thioxanthone, 2,4-dimethyl thioxanthone, 2,4-diisopropyl thioxanthone, 2-isopropyl thioxanthone, 4-diisopropyl thioxanthone, 2-isopropyl thioxanthone, 2,4-dichlorothioxanthone, 2-chlorothioxanthone, and 2-hydroxy-3-(3,4-dimethyl-9-oxo-9H-thioxanthon-2-yloxy-N,N,N-trimethyl-1-propaneamine hydrochloride. These dialkylaminobenzophenone compounds and thioxanthone compound are categorized into hydrogen abstraction type photopolymerization initiators.

The amount of the photopolymerization initiator in the printing ink composition is preferably 1% to 20% by mass, more preferably 3% to 15% by mass, and most preferably 5% to 13% by mass. The amount of the photopolymerization initiator within the above-mentioned range in the printing ink composition can achieve the compatibility between sufficient hardenability of the printing ink composition and satisfactory internal hardenability and cost.

In addition to the photopolymerization initiator, the printing ink composition may further contain a tertiary amine compound as a sensitizer. Examples of the tertiary amine compound include ethyl 4-dimethylaminobenzoate, trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, N,N-dimethylaniline, N,N-diethylaniline, N,N-dimethyl-p-toluidine, N,N-dihydroxyethylaniline, triethylamine, and N,N-dimethylhexylamine. Among these sensitizers, aromatic tertiary amine compounds such as ethyl 4-dimethylaminobenzoate, p-diethylaminoacetophenone, ethyl p-dimethylaminobenzoate, isoamyl p-dimethylaminobenzoate, N,N-dimethylaniline, N,N-diethylaniline, N,N-dimethyl-p-toluidine, and N,N-dihydroxyethylaniline are more preferred. When these sensitizers are contained in the printing ink composition, the ratio of the photopolymerization initiator to the sensitizer (photopolymerization initiator:sensitizer) can be, for example, about 1:0.1 to 1:1. The α-(dialkyl)aminoalkylphenone compounds, α-morpholinoaklylphenone compounds, and dialkylaminobenzophenone compounds already described as photopolymerization initiators are tertiary amine compounds and also serve as photopolymerization initiators. In the present invention, however, these compounds are not regarded as sensitizers. That is, the printing ink composition may further contain a tertiary amine compound as the sensitizer, other than the α-(dialkyl)aminoalkylphenone compounds, α-morpholinoaklylphenone compounds, and dialkylaminobenzophenone compounds.

[Colorant]

The colorant is a component for providing a coloring power to the printing ink composition and is mainly a color pigment. Unlimited examples of the color pigment include organic and/or inorganic pigments that have been contained in traditional printing ink compositions.

Examples of such color pigments include yellow pigments such as Disazo yellows (Pigment Yellows 12, 13, 14, 17, and 1) and Hansa yellow; magenta pigments such as Brilliant Carmine 6B, Lake Red C, and Watching Red; cyan pigments such as Phthalocyanine Blue, Phthalocyanine Green, and Alkali Blue; and black pigments such as carbon black.

The printing ink composition may contain the color pigment in any amount, and the amount of the color pigment is, for example, about 8% to 30% by mass based on the total amount of the printing ink composition. When a yellow printing ink composition, a magenta printing ink composition, a cyan printing ink composition, and a black printing ink composition, respectively, are prepared with a yellow pigment, a magenta pigment, a cyan pigment, and a black pigment, each of the printing ink compositions may further contain a pigment or printing ink composition of a complementary color.

[Extender Pigment]

The extender pigment is a component for providing characteristics, such as appropriate printing and viscoelastic characteristics, to the printing ink composition.

The printing ink composition of the present invention is characterized by the use of an extender pigment having a median diameter (d50) of 1.0 to 2.0 µm measured by laser diffractometry. In general, if an extender pigment is added to a printing ink composition for providing suitable properties, such as suitable viscoelasticity, the particle diameter is usually about 0.01 to 0.5 µm, and a large particle diameter as mentioned above is not common. However, the present inventors have surprisingly found, in the process of investigating preventing the slurring phenomenon in an active energy ray-curable offset printing ink composition, that the use of an extender pigment having a large particle diameter of 1.0 to 2.0 µm can significantly prevent the slurring phenomenon, and have arrived at the present invention. Accordingly, the printing ink composition of the present invention necessarily contains an extender pigment having a median diameter (d50) of 1.0 to 2.0 µm measured by laser diffractometry. The median diameter (d50) of the extender pigment measured by laser diffractometry is preferably 1.0 to 1.7 µm and more preferably 1.0 to 1.5 µm. The compatibility between inhibition of the slurring phenomenon and satisfactory gloss and hardenability of the printed surface can be achieved by adjusting the median diameter (d50) of the extender pigment within the above-mentioned range. The reason why the slurring phenomenon is prevented by an extender pigment within the above-mentioned particle diameter range is not obvious, but is presumed as follows. That is, when a printing ink composition is transferred from the printing plate to the blanket, the entire quantity of the printing ink composition on the printing plate is not transferred to the blanket. The printing ink composition is divided into the printing ink composition remaining on the printing plate and the printing ink composition transferred to the blanket, and thereby filaments occur. The filaments are one cause of the slurring phenomenon. It is presumed that in a printing ink composition containing the extender pigment having a large particle diameter as mentioned above, the large particle diameter of the extender pigment prevents the filaments from elongating and as a result, the slurring phenomenon is prevented.

The term "median diameter (d50)" refers to the diameter of a particle that is positioned so as to divide a particle size distribution of a powder into two halves when the particle size distribution is obtained by plotting the particle diameter on the horizontal axis and the number of particles on the vertical axis. The determination of the median diameter (d50) of powder by laser diffractometry can be performed with, for example, a particle size distribution analyzer, model SALD-2000J (trade name), manufactured by Shimadzu Corporation, a laser diffraction/scattering particle size distribution analyzer, model MT3300 (trade name), manufactured by Nikkiso Co., Ltd., or a particle size distribution analyzer, model Multisizer 3 (trade name), manufactured by Beckman Coulter, Inc.

The extender pigment is preferably talc and/or mica. An extender pigment having a large particle diameter is not usually used because such an extender pigment contained in a printing ink composition decreases the printing resistance of the printing plate to cause a trouble in long-run printing. This is a phenomenon of damaging the surface of the printing plate with the extender pigment having a large particle diameter and causing wear. From such a viewpoint, the extender pigment having a large particle diameter in the printing ink composition of the present invention is preferably talc or mica having a low hardness.

The amount of the extender pigment having a large particle size as described above in the printing ink composition is preferably 0.5% to 5% by mass. An amount of the extender pigment having a large particle size within the above-mentioned range can effectively prevent occurrence of the slurring phenomenon and wear of the printing plate. The amount of the extender pigment having a large particle diameter in the printing ink composition is more preferably 1% to 5% by mass and most preferably 1% to 4% by mass.

The printing ink composition of the present invention optionally contains various types of extender pigments that are usually contained in printing ink compositions, in addition to the extender pigment having a large particle diameter. Examples of such additional extender pigments include clay, kaolinite (kaolin), barium sulfate, magnesium sulfate, calcium carbonate, silicon oxide (silica), bentonite, and titanium oxide. The printing ink composition may contain such extender pigments in any amount, and the amount of the extender pigments is, for example, about 0% to 33% by mass based on the total amount of the printing ink composition.

[Resin Component]

The printing ink composition of the present invention may contain various types of resin components, in addition to the above-described monomers and oligomers. Such resin components have been used in traditional printing ink compositions and preferably have compatibility with the monomers or oligomers. Examples of the resin include poly(diallyl phthalate), styrene-acrylic resins, acrylic resins, alkyd resins, rosin-modified phenolic resins, rosin-modified maleic resins, rosin-modified alkyd resins, rosin-modified petroleum resins, rosin ester resins, petroleum resin-modified phenolic resins, acrylic-modified phenolic resins, vegetable oil-modified alkyd resins, and petroleum resins. Among these resins, the styrene-acrylic resins and the poly(diallyl phthalate) are preferred because of their compatibility with monomers or oligomers.

The styrene-acrylic resin is a copolymer of styrene and an acrylic ester, and may be a commercially available one. If a styrene-acrylic resin is used, it is convenient that a solid of a styrene-acrylic resin is dissolved in the above-mentioned monomer into varnish and that the varnish is added to a printing ink composition during preparation of the composition. In this case, the amount of the styrene-acrylic resin in the varnish may be appropriately determined in consideration of, for example, handling ability and can be, for example, about 5% to 50% by mass.

The amount of the resin component in the printing ink composition is preferably 5% to 50% by mass, more preferably 5% to 30% by mass, and most preferably 5% to 20% by mass. The amount of the resin component within the above-mentioned range is preferred because it can provide appropriate viscoelasticity to the printing ink composition to prevent occurrence of, for example, misting and can secure satisfactory hardenability of the printing ink composition.

[Various Types of Additives]

The printing ink composition may contain various additives, in addition to the components described above, as necessary for reasons of improving the preservation stability, printability, and other factors. Examples of these additives include polymerization inhibitors, dispersants, salts such as phosphate, waxes such as polyethylene waxes, olefin waxes, and Fischer-Tropsch waxes, alcohols, and oil components such as vegetable oils and mineral oils.

Preferred examples of the polymerization inhibitor include phenol compounds, such as butylhydroxytoluene; tocopherol acetate, nitrosamines, benzotriazole, and hindered amines. In particular, butylhydroxytoluene is more preferred. The printing ink composition containing a polymerization inhibitor can barely thicken due to progress of polymerization during preservation. The amount of the polymerization inhibitor in the printing ink composition can be about 0.1% to 1% by mass.

The dispersant is used for satisfactorily dispersing the colorant and the extender pigment in the printing ink composition. Such dispersants are commercially available, and examples thereof include DISPERBYK (trade name) series manufactured by BYK Japan K.K.

The printing ink composition of the present invention can be produced from the components described above by a known method. For example, the components are mixed and are then milled with a bead mill, a three-roll mill, or another mill to disperse the pigments (i.e., the colorant and the extender pigment); additives (e.g., a polymerization inhibitor, alcohol, or wax) are then added to the milled mixture as necessary; and the viscosity is adjusted by further addition of the monomer component or an oil component to the mixture. The printing ink composition may have any viscosity, and the viscosity measured with a Laray viscometer at 25° C. can be 10 to 60 Pa·s.

EXAMPLES

The printing ink composition of the present invention will now be described in more detail by Examples, which should not be construed to limit the present invention. In the following description, the symbol "%" refers to "% by mass" and the term "part(s)" refers to "part(s) by mass," unless otherwise specified.

[Varnish A]

A commercially available styrene-acrylic resin (copolymer of styrene and an acrylic monomer, manufactured by Seiko PMC Corporation) (40 parts by mass) was dissolved in trimethylolpropane triacrylate (TMPTA) (60 parts by mass) at 100° C. with stirring to prepare varnish A.

[Varnish B]

A commercially available poly(diallyl phthalate) (manufactured by Daiso Co., Ltd., trade name: Daiso DAP-A) (40 parts by mass) was dissolved in ditrimethylolpropane tetraacrylate (DITMPTA) (60 parts by mass) at 100° C. with stirring to prepare varnish B.

[Preparation of Printing Ink Composition]

Varnish A, varnish B, calcium carbonate (d50: 0.08 μm), silica (d50: 0.02 μm), talc (d50: 5 μm, 3.8 μm, 2.5 μm, 1.5 μm, or 1.2 μm), mica (d50: 2.5 μm, 1.5 μm, 1.2 μm, or 0.9 μm), a colorant (Pigment Yellow 12), photopolymerization initiator A1 (chemical name: 2-benzyl-2-dimethylamino-amino-1-(4-morpholinophenyl)-butan-1-one, corresponding to the α-(dialkyl)aminoalkylphenone compound), photopolymerization initiator A2 (chemical name: 2-dimethylamino-2-(4-methylbenzyl)-1-(4-morpholin-4-yl-phenyl)-butan-1-one, corresponding to the α-(dialkyl)aminoalkylphenone compound), photopolymerization initiator B1 (chemical name: 2-methyl-1-(4-methylthio)phenyl-2-morpholinopropan-1-one, corresponding to the α-morpholinoaklylphenone compound), photopolymerization initiator C1 (chemical name: 4,4'-bisdimethylaminobenzophenone, corresponding to the dialkylaminobenzophenone compound), photopolymerization initiator C2 (chemical name: 4,4'-bisdiethylaminobenzophenone, corresponding to the dialkylaminobenzophenone compound), photopolymerization initiator D1 (chemical name: 2,4-diethylthioxanthone, corresponding to the thioxanthone compound), photopolymerization initiator D2 (chemical name: 2,4-dimethylthioxanthone, corresponding to the thioxanthone compound), or photopolymerization initiator E1 (chemical name: 2,4,6-trimethylbenzoyl diphenylphosphine oxide: TPO), a sensitizer (chemical name: methyl 4-dimethylaminobenzoate, corresponding to the tertiary amine compound), and a trimethylolpropane triacrylate (TMPTA) were mixed in accordance with formulations shown in Tables 1 and 2. The mixture was then milled with a three-roll mill. The viscosity of the mixture was adjusted to 40 Pa·s with trimethylolpropane triacrylate to prepare printing ink compositions of Examples 1 to 16 and Comparative Examples 1 to 5. The unit of the formulated amounts in Tables 1 and 2 is part(s) by mass.

[Evaluation of Hardenability]

A printing ink composition was applied to coated paper (Mitsubishi special Art 110K) at a density of 0.1 mL/204 cm$^2$ with an RI-2 type applier bisection roller (manufactured by Akira Seisakusyo) to prepare a test piece. The test piece was then irradiated with UV rays with a 160 W/cm metal halide lamp (focal length: 13 cm, concentrated, single lamp, manufactured by Heraeus K.K.). On this occasion, the curing rate until becoming tack free was evaluated by finger touch. The evaluation criteria consist of the following five grades. The results of evaluation are shown in Tables 1 and 2.

(Evaluation Criteria)

5: curing rate≥100 m/min or more 4.5: 100 m/min>curing rate≥90 m/min

4: 90 m/min>curing rate≥80 m/min 3.5: 80 m/min>curing rate≥70 m/min

3: 70 m/min>curing rate≥60 m/min 2.5: 60 m/min>curing rate≥50 m/min

2: 50 m/min>curing rate≥40 m/min

1: 40 m/min>curing rate≥20 m/min

[Evaluation of Gloss]

The gloss value was measured for the tack-free test pieces after the evaluation of the hardenability. In the measurement, the 60° reflection gloss was measured with a Murakami type digital glossmeter (manufactured by Murakami Color Research Laboratory). The evaluation criteria consist of the following five grades. The results of evaluation are shown in Tables 1 and 2.

(Evaluation Criteria)

5: gloss value≥50

4: 50>gloss value≥45

3.5: 45>gloss value≥40

3: 40>gloss value≥35

2: 35>gloss value≥25

1: 25>gloss value

[Evaluation of Slurring]

The slurring phenomenon was evaluated by actually performing printing with a Mitsubishi DAIYA A2-plus size sheet printer 1-E (manufactured by Mitsubishi Heavy Industries, Ltd.). The printing rate was 11,000 sheets/hr, and the upper direction (the direction of the tail edge) of the type section was evaluated for contamination due to a whisker slurring phenomenon by observation with an optical microscope. The evaluation criteria consist of the following five grades. The results of evaluation are shown in Tables 1 and 2. The slurring evaluated as the middle between two grades was evaluated as, for example, "3.5" or "4.5".

(Evaluation Criteria)

5: No slurring was observed with optical microscope.
4: Slight slurring was observed with optical microscope.
3: Slurring was observed with optical microscope, but substantially not with naked eyes.
2: Slurring was observed with naked eyes.
1: Significant slurring was observed with naked eyes.

TABLE 1

|  | d50 (µm) | Example |  |  |  |  |  |  |  |  |  |  |  |
|---|---|---|---|---|---|---|---|---|---|---|---|---|---|
|  |  | 1 | 2 | 3 | 4 | 5 | 6 | 7 | 8 | 9 | 10 | 11 | 12 |
| Varnish A |  | 19 | 19 | 19 | 19 | 19 | 19 | 19 | 19 | 19 | 19 | 19 | 19 |
| Varnish B |  | 44 | 44 | 46.5 | 44 | 44 | 39 | 44 | 44 | 44 | 44 | 44 | 44 |
| Colorant |  | 12 | 12 | 12 | 12 | 12 | 12 | 12 | 12 | 12 | 12 | 12 | 12 |
| Talc | 5 |  |  |  |  |  |  |  |  |  |  |  |  |
|  | 3.8 |  |  |  |  |  |  |  |  |  |  |  |  |
|  | 2.5 |  |  |  |  |  |  |  |  |  |  |  |  |
|  | 1.5 | 5 |  |  |  |  |  | 5 | 5 | 5 | 5 | 5 | 5 |
|  | 1.0 |  | 5 | 2.5 |  |  | 10 |  |  |  |  |  |  |
| Mica | 1.5 |  |  |  | 5 |  |  |  |  |  |  |  |  |
|  | 1.0 |  |  |  |  | 5 |  |  |  |  |  |  |  |
| Photopolymerization initiator A1 |  |  |  |  |  |  |  | 3 |  |  | 1.5 | 3 | 3 |
| Photopolymerization initiator A2 |  |  |  |  |  |  |  |  | 3 |  | 1.5 |  | 3 |
| Photopolymerization initiator B1 |  | 10 | 10 | 10 | 10 | 10 | 10 | 4 | 4 | 4 | 4 | 4 | 4 |
| Photopolymerization initiator C1 |  | 2 | 2 | 2 | 2 | 2 | 2 |  |  |  |  |  |  |
| Photopolymerization initiator C2 |  |  |  |  |  |  |  | 2.5 | 2.5 | 2.5 | 2.5 | 2.5 | 2.5 |
| Photopolymerization initiator D1 |  |  |  |  |  |  |  | 0.5 | 0.5 | 0.5 | 0.25 | 0.5 | 0.5 |
| Photopolymerization initiator D2 |  |  |  |  |  |  |  |  |  |  | 0.25 |  |  |
| Photopolymerization initiator E1 |  |  |  |  |  |  |  |  |  |  |  |  |  |
| Sensitizer |  |  |  |  |  |  |  | 0.8 | 0.8 | 0.8 | 0.8 |  |  |
| TMPTA |  | 8 | 8 | 8 | 8 | 8 | 8 | 8 | 8 | 8 | 8 | 8 | 8 |
| Hardenability |  | 3 | 3.5 | 4 | 3.5 | 3 | 2 | 4.5 | 4.5 | 4.5 | 4.5 | 4.0 | 4.0 |
| Gloss |  | 3 | 3 | 3.5 | 3 | 3 | 2 | 3 | 3 | 3 | 3 | 3 | 3 |
| Slurring |  | 4.5 | 4 | 4 | 3.5 | 4 | 5 | 4.5 | 4.5 | 4.5 | 4.5 | 4.5 | 4.5 |

TABLE 2

|  | d50 (µm) | Example |  |  |  | Comparative Example |  |  |  |  |
|---|---|---|---|---|---|---|---|---|---|---|
|  |  | 13 | 14 | 15 | 16 | 1 | 2 | 3 | 4 | 5 |
| Varnish A |  | 19 | 19 | 19 | 19 | 19 | 19 | 19 | 19 | 19 |
| Varnish B |  | 44 | 44 | 44 | 44 | 44 | 44 | 44 | 39 | 47 |
| Colorant |  | 12 | 12 | 12 | 12 | 12 | 12 | 12 | 12 | 12 |
| Talc | 5 |  |  |  |  | 5 |  |  |  |  |
|  | 3.8 |  |  |  |  |  | 5 |  |  |  |
|  | 2.5 |  |  |  |  |  |  | 5 |  |  |
|  | 1.5 | 5 | 5 | 5 | 5 |  |  |  |  |  |
|  | 1.0 |  |  |  |  |  |  |  |  |  |
| Mica | 1.5 |  |  |  |  |  |  |  |  |  |
|  | 1.0 |  |  |  |  |  |  |  |  |  |
| Photopolymerization initiator A1 | 0.08 |  |  |  |  |  |  |  | 10 |  |
| Photopolymerization initiator A2 | 0.02 |  |  |  |  |  |  |  |  | 2 |
| Photopolymerization initiator B1 |  | 1.5 | 3 |  |  |  |  |  |  |  |
| Photopolymerization initiator C1 |  | 1.5 |  |  |  |  |  |  |  |  |
| Photopolymerization initiator C2 |  | 4 | 4 |  |  | 10 | 10 | 10 | 10 | 10 |
| Photopolymerization initiator D1 |  |  |  | 2 | 2 | 2 | 2 | 2 | 2 | 2 |
| Photopolymerization initiator D2 |  | 2.5 | 2.5 |  |  |  |  |  |  |  |

TABLE 2-continued

| | d50 (μm) | Example | | | | Comparative Example | | | | |
|---|---|---|---|---|---|---|---|---|---|---|
| | | 13 | 14 | 15 | 16 | 1 | 2 | 3 | 4 | 5 |
| Photopolymerization initiator E1 | | 0.5 | 0.25 | | | | | | | |
| Sensitizer | | | 0.25 | | | | | | | |
| TMPTA | | | | 8 | 8 | | | | | |
| Varnish A | | | | | 0.8 | | | | | |
| Varnish B | | 8 | 8 | 8 | 8 | 8 | 8 | 8 | 8 | 8 |
| Hardenability | | 4.0 | 4.0 | 4.0 | 3.5 | 1 | 2 | 2.5 | 4.5 | 4.5 |
| Gloss | | 3 | 3 | 3 | 3 | 1 | 1 | 2 | 4 | 4 |
| Slurring | | 4.5 | 4.5 | 4.5 | 4.5 | 5 | 5 | 4.5 | 1 | 2 |

Comparison between Examples and Comparative Examples demonstrates that a median diameter, d50, of the extender pigment larger than the range defined by the present invention provides insufficient hardenability and gloss to cause practical problems and that a median diameter, d50, of the extender pigment smaller than the range defined by the present invention causes a significant slurring phenomenon to cause practical problems. In contrast, a median diameter, d50, of the extender pigment within the range defined by the present invention can prevent the slurring phenomenon and can provide practical hardenability and gloss to the printing ink composition. Comparison between Examples 1 to 5 and Example 6 demonstrates that with an amount of the extender pigment having a large particle diameter of 0.5% to 5% by mass, better hardenability and gloss can be achieved. Comparison of Example 1 and Examples to 16 demonstrates that the hardenability can be improved using an α-(dialkyl)aminoalkylphenone compound, an α-morpholinoaklylphenone compound, a combination of a dialkylaminobenzophenone compound and a thioxanthone compound, or a combination of 2,4,6-trimethylbenzoyl diphenylphosphine oxide and a dialkylaminobenzophenone compound, as the photopolymerization initiator.

The invention claimed is:

1. An active energy ray-curable offset printing ink composition comprising:
    a compound having an ethylenically unsaturated bond;
    a photopolymerization initiator;
    a colorant; and
    an extender pigment, wherein
    the extender pigment has a median diameter (d50) of 1.0 to 2.0 μm measured by laser diffractometry, and
    a viscosity of the printing ink composition measured with a Laray viscometer at 25° C. is 10 to 60 Pa s.

2. The active energy ray-curable offset printing ink composition according to claim 1, wherein
    the extender pigment is talc and/or mica.

3. The active energy ray-curable offset printing ink composition according to claim 1, wherein
    an amount of the extender pigment is 0.5% to 5% by mass.

4. The active energy ray-curable offset printing ink composition according to claim 1, wherein
    the photopolymerization initiator is an α-(dialkyl)aminoalkylphenone compound, an α-morpholinoaklylphenone compound, a combination of a dialkylaminobenzophenone compound and a thioxanthone compound, or a combination of 2,4,6-trimethylbenzoyl diphenylphosphine oxide and a dialkylaminobenzophenone compound.

5. The active energy ray-curable offset printing ink composition according to claim 1, further comprising a tertiary amine compound.

6. The active energy ray-curable offset printing ink composition according to claim 2, wherein
    an amount of the extender pigment is 0.5% to 5% by mass.

7. The active energy ray-curable offset printing ink composition according to claim 2, wherein
    the photopolymerization initiator is an α-(dialkyl)aminoalkylphenone compound, an α-morpholinoaklylphenone compound, a combination of a dialkylaminobenzophenone compound and a thioxanthone compound, or a combination of 2,4,6-trimethylbenzoyl diphenylphosphine oxide and a dialkylaminobenzophenone compound.

8. The active energy ray-curable offset printing ink composition according to claim 3, wherein
    the photopolymerization initiator is an α-(dialkyl)aminoalkylphenone compound, an α-morpholinoaklylphenone compound, a combination of a dialkylaminobenzophenone compound and a thioxanthone compound, or a combination of 2,4,6-trimethylbenzoyl diphenylphosphine oxide and a dialkylaminobenzophenone compound.

9. The active energy ray-curable offset printing ink composition according to claim 6, wherein
    the photopolymerization initiator is an α-(dialkyl)aminoalkylphenone compound, an α-morpholinoaklylphenone compound, a combination of a dialkylaminobenzophenone compound and a thioxanthone compound, or a combination of 2,4,6-trimethylbenzoyl diphenylphosphine oxide and a dialkylaminobenzophenone compound.

10. The active energy ray-curable offset printing ink composition according to claim 2, further comprising a tertiary amine compound.

11. The active energy ray-curable offset printing ink composition according to claim 3, further comprising a tertiary amine compound.

12. The active energy ray-curable offset printing ink composition according to claim 4, further comprising a tertiary amine compound.

13. The active energy ray-curable offset printing ink composition according to claim 6, further comprising a tertiary amine compound.

14. The active energy ray-curable offset printing ink composition according to claim 7, further comprising a tertiary amine compound.

15. The active energy ray-curable offset printing ink composition according to claim 8, further comprising a tertiary amine compound.

16. The active energy ray-curable offset printing ink composition according to claim 9, further comprising a tertiary amine compound.

\* \* \* \* \*